United States Patent [19]

Ehemann, Jr.

[11] Patent Number: 4,586,817

[45] Date of Patent: May 6, 1986

[54] METHOD FOR DETERMINING THE MTF OF A VIEWING WINDOW

[75] Inventor: George M. Ehemann, Jr., Manheim Township, Lancaster County, Pa.

[73] Assignee: RCA Corporation, Princeton, N.J.

[21] Appl. No.: 583,973

[22] Filed: Feb. 27, 1984

[51] Int. Cl.$^4$ ............................................. G01M 11/02
[52] U.S. Cl. ................................................. 356/124.5
[58] Field of Search ...................... 356/124, 124.5, 239; 358/10, 139

[56] References Cited

U.S. PATENT DOCUMENTS

| | | | |
|---|---|---|---|
| 2,816,474 | 12/1957 | Powell | 88/14 |
| 3,733,135 | 5/1973 | Diakides et al. | 356/124.5 X |
| 3,904,293 | 9/1975 | Gee | 356/118 |
| 4,076,426 | 2/1978 | Gross et al. | 356/239 |

FOREIGN PATENT DOCUMENTS

| | | | |
|---|---|---|---|
| 58415 | 5/1977 | Japan | 358/139 |
| 161778 | 12/1981 | Japan | 358/139 |

OTHER PUBLICATIONS

Nagaoka et al., *Japan Electronic Engineering*, No. 85, Dec. 1973, pp. 48–52.
Nagaoka et al., *National Technical Report*, vol. 20, No. 6, Dec. 1974, pp. 756–774.
O. H. Schade, "A New System of Measuring and Specifying Image Definition," NBS Circular 526, Apr. 29, 1954.
O. H. Schade, Sr., "Image Quality A Comparison of Photographic and Television Systems," RCA Laboratories, Princeton, N.J., 1975, pp. 1 to 19 and 22 to 25.

*Primary Examiner*—F. L. Evans
*Attorney, Agent, or Firm*—Eugene M. Whitacre; Dennis H. Irlbeck; LeRoy Greenspan

[57] ABSTRACT

Method comprises producing a pattern of alternate light and dark areas along a particular path on the back surface of a viewing window, scanning the image of the pattern along the projected path with a photodetector in such manner as to produce an alternating image signal, and then deriving the value of MTF (modulation transfer function) from the image signal. The viewability of images transmitted through the viewing window can be then characterized by a combination of values of MTF and SR (specular reflection).

17 Claims, 8 Drawing Figures

METHOD FOR DETERMINING THE MTF OF A VIEWING WINDOW

BACKGROUND OF THE INVENTION

This invention relates to a method for determining the value of the MTF (modulation transfer function) of a viewing window, such as the viewing window used for or in a television or a data display tube.

There are many situations where a picture or pattern on the back surface of a viewing window is viewed through the window at some distance from the front or viewing surface. Two examples of such situations are windows used in color television and information data displays, both of which may be parts of cathode-ray tubes. In both cases, the front surface may be untreated or may be treated, as by grinding, etching, coating or other process, to reduce reflection or glare from ambient light sources. Such treatment may result in a reduction in the resolution or viewability of pictures or patterns that are displayed on the back surface of the window.

Until now, it has been the practice to measure the specular reflectance or the roughness of the front surface, and then to evaluate subjectively the relative sharpness or blurriness of a picture on the back surface of the window as viewed through the window. Quantitative comparisons of the viewability quality of the window are not possible with such subjective evaluations.

MTF (modulation transfer function) has been used to characterize the resolution of details of a picture or pattern for various components of a television system and in a conventional chemical photographic process. See, for example, "A New System of Measuring and Specifying Image Definitions," O. H. Schade, National Bureau of Standards Circular No. 526, Apr. 29, 1954, and "Image Quality—A Comparison of Photographic and Television Systems," O. H. Schade, Sr., RCA Laboratories, Princeton, N.J., 1975. However, such publications do not provide a method for determining the value of the MTF of a viewing window, particularly a method that can be used for routinely grading viewing windows both before and after the window is incorporated into an operable device.

SUMMARY OF THE INVENTION

The novel method comprises (A) producing a pattern of light on one surface of a window of interest, the pattern consisting of alternate areas of light and darkness along a particular path, the alternations being at a particular spatial frequency, preferably in the range of 1 to 8 cycles per millimeter. Then, (B) projecting at least a portion of the pattern including said path through the window, and (C) scanning the projected image along the projected path in an image plane with a photodetector in such manner as to produce an image signal that is alternating in character at the spatial frequency. The average maximum and minimum values ($V_{max}$ and $V_{min}$) of the image signal are calculated (D), and (E) the value of the MTF at the spatial frequency is calculated according to the formula $$MTF = \frac{V_{max} - V_{min}}{V_{max} + V_{min}}.$$

The pattern may be produced by back lighting an opaque-and-clear stencil positioned on the back surface of the window before the window is assembled into an operable device, or the pattern may be produced by exciting selected portions of a luminescent screen on the back surface of the window after it is assembled into an operable tube. By the novel method, viewing windows with any type of finish on the front surface may be graded quantitatively before or after assembly into an operable device. The novel method is practical for routine factory use.

DETAILED DESCRIPTION OF THE PREFERRED EMBODIMENTS

Example 1

Figure 1:
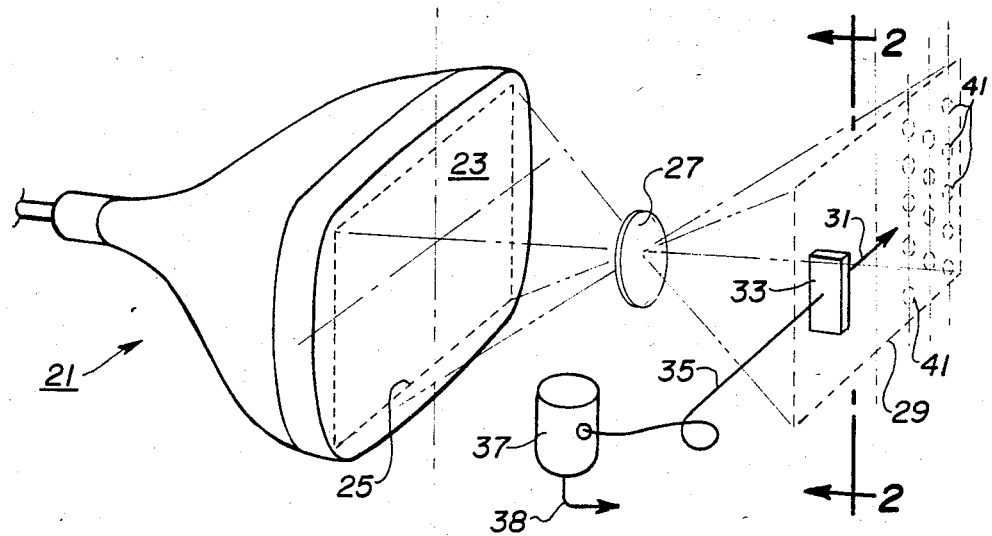
FIG. 1 is a perspective view of an arrangement for determining the MTF value of the viewing window of an operable device.

The value of MTF for the viewing window of an operable CRT (cathode-ray tube) may be determined with the arrangement shown in FIG. 1. That arrangement includes an operating shadow-mask-type CRT 21 comprising the glass viewing window 23 being graded and a luminescent viewing screen on the back or inner surface of the window 23. The viewing screen includes a black matrix having a hexagonal array of red-emitting, green-emitting and blue-emitting luminescent circular areas or dots repetitively arranged in trios. The dots are arranged in vertical columns on center lines that are about 0.08 mm (3.3 mils) apart horizontally. The dots in every other row are aligned horizontally on center lines that are about 0.29 mm (11.5 mils) apart vertically. The dots in adjacent rows are offset vertically by half the vertical spacing. This type of CRT is a common design for use as a color television and color computer information display.

An electron-beam raster 25 is scanned on the viewing screen in such manner as to excite only one of the color-emitting areas, the green-emitting areas in this example, thereby producing a pattern of alternating areas of light and darkness along a number of paths. In this example, the excited green dots are arranged in vertical columns on center lines that are about 0.25 mm (10 mils) apart, or 4 dots per millimeter. The path of interest is normal to the length of the columns, or horizontal with respect to vertical columns.

The pattern of green dots is projected through an objective lens 27 to an image plane 29 where the image 29 of the pattern 25 is scanned horizontally as indicated by the arrow 31 with a photodetector. FIG. 1 shows a magnification of about 1:1. However, other magnifications may be used. In the examples herein, the actual magnifications are about 1:2.5. The photodetector includes an opaque plate in a dark box 33, the plate having a vertical slit about 1.0 mil wide and about 100 mils high. Light passing into the slit is collected in glass fibers and passed by light pipe 35 to a photopic filter and a photomultiplier tube in a dark container 37, where it is converted to an electrical image signal and delivered by the wire 38 for analysis. The dark box 33 may be part of a commercially-available unit, such as a scanning photometric eyepiece marketed by Gamma Scientific Corp., New York, NY.

Figure 2:
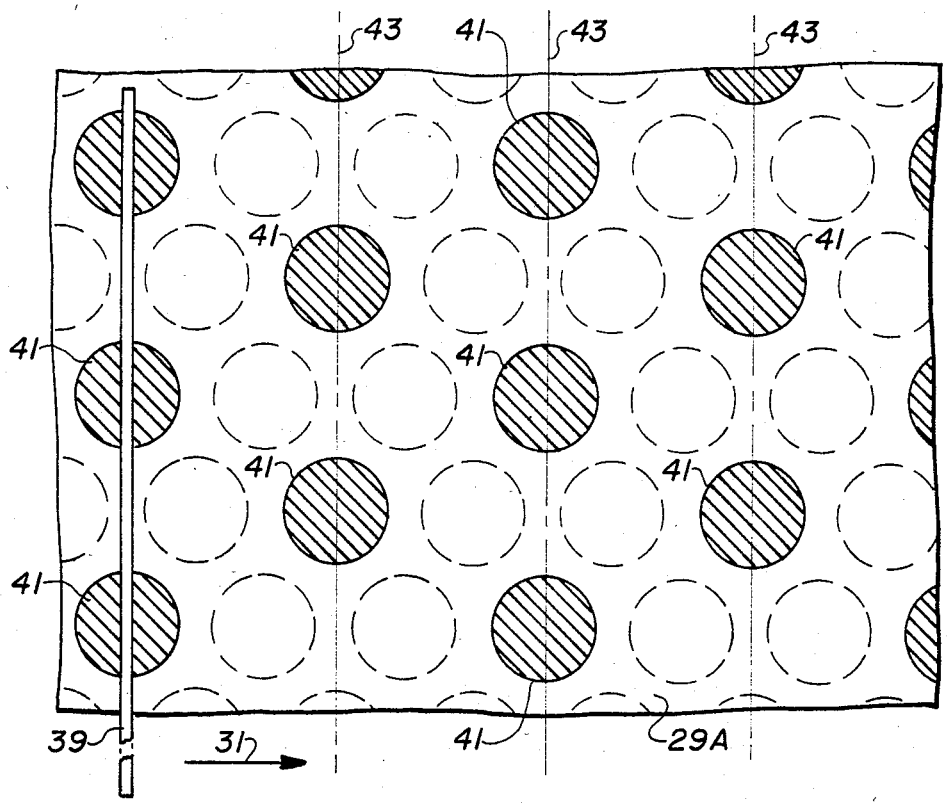
FIG. 2 is an elevational view of the image plane viewed along section line 2—2 of FIG. 1.

FIG. 2 shows a fragment 29A of the image plane 29 viewed from behind the slit shown by the solid rectangle 39. The images 41 of the excited green-emitting dots are shown by the hatched solid circular areas. Considering a magnification of 2.5, the images of the green-emitting dots are arranged in vertical columns and centered on the vertical axes 43, which axes 43 are about 2.5 times 0.25 mm (10 mils) apart, or 4 columns per 2.5 millimeters. The images of the nonexcited dots are shown by the unhatched dashed circular areas. The slit 39 is much narrower horizontally and much longer vertically than the diameters of the dot images 41. Thus, the slit intercepts small vertical segments of the areas of many dots in a column.

Figure 3:
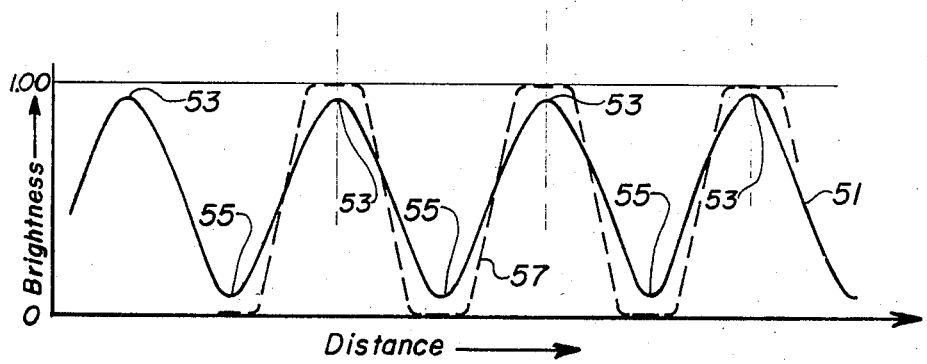
FIG. 3 is a graph showing the relationship of idealized image signals to the image plane shown in FIG. 2.
Figure 6:
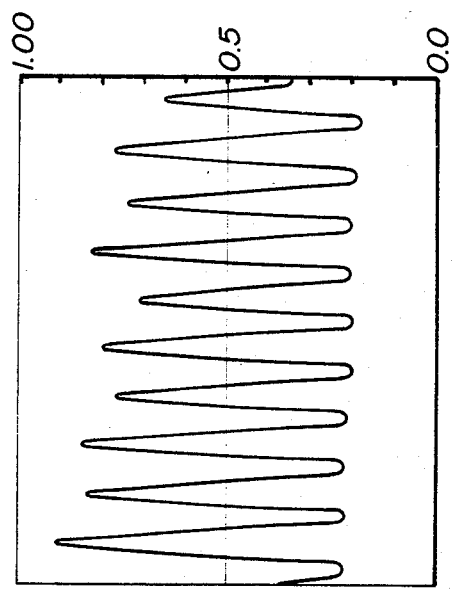
FIGS. 5, 6, 7 and 8 are graphs of actual image signals derived from viewing windows with different finishes on their front surfaces.
Figure 8:
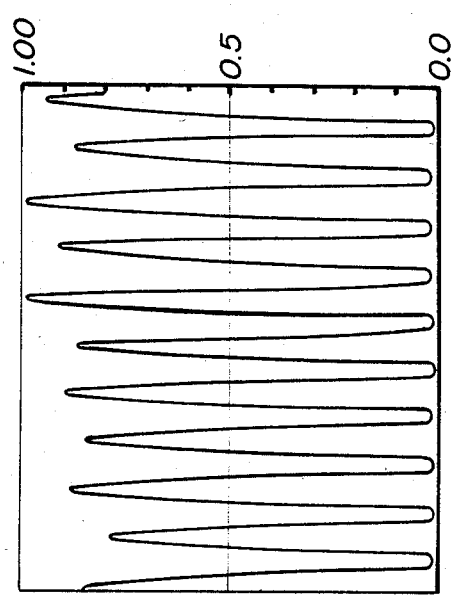
Figure 5:
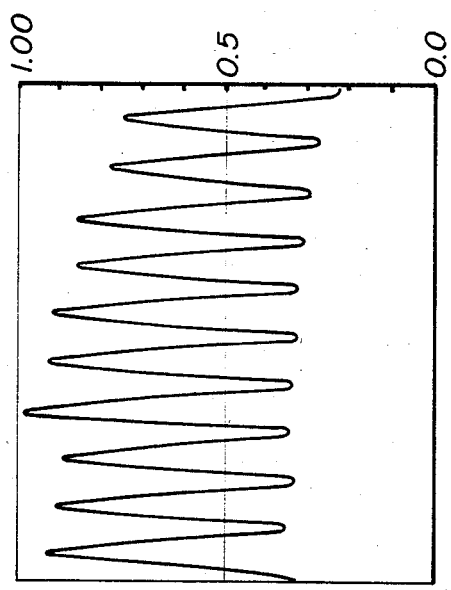
Figure 7:
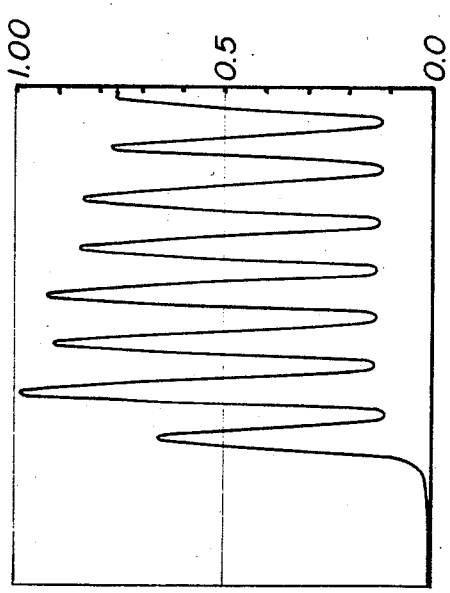

When scanning the image plane 29 in the direction normal to the axes 43, as shown by the arrow 31, an image signal is generated which is represented by the solid alternating image signal curve 51 shown in FIG. 3. The peaks 53 of the curve 51 correlate spatially with the axes 43, and the low points 55 correlate with spatial positions half way between. The curve represents the brightness as a fraction of the maximum possible brightness at the axes for a viewing window that has a perfect modulation transfer function of 1.00. The values of the peaks are averaged to provide an average value $V_{max}$, and the values of the low points are averaged to provide an average value $V_{min}$. The value of the modulation transfer function MTF is calculated according to the relation $$MTF = \frac{V_{max} - V_{min}}{V_{max} + V_{min}}.$$

A window with a perfect MTF would have $V_{max}=1.0$, $V_{min}=0.0$ and MTF=1.0. Its image signal curve is calculated to approximate the dashed curve 57 in FIG. 3. The dashed curve 57 is wide and flat at its high and low points, and has $V_{max}$ and $V_{min}$ values of 1.0 and 0.0 respectively. A departure from a perfect MTF reduces $V_{max}$, increases $V_{min}$, and reduces MTF. Reduced MTF indicates quantitatively to what extent the viewed image is blurred in passing through the window. Measuring the roughness of the outer or front surface of the window provides at best a qualitative measure of the extent of the blurring of the image in passing through the window.

Example 2

Figure 4:
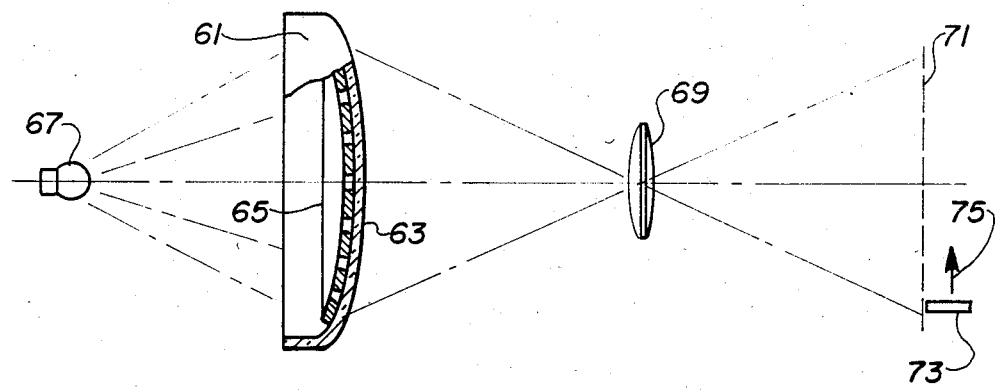
FIG. 4 is a partially-sectional plan view of an arrangement for determining the MTF value of a viewing window prior to assembly into an operable device.

The value of the MTF for the viewing window before assembly into a CRT may be determined with the arrangement shown in FIG. 4. That arrangement shows a faceplate panel 61 having an integral viewing window 63. An opaque stencil 65, having an array of apertures therein whose size and spacing are similar to the excited dots in the raster 25 of FIG. 1, is positioned in contact with the inner or back surface of the window. Such a stencil could be a part of a shadow mask for use with such a panel 61.

The stencil 65 is back lighted from a light source 67 so that light passes through the apertures and the window 63, thereby producing a pattern of alternating areas of light and darkness similar to the pattern mentioned in Example 1. The light source 67 may be an incandescent lamp or a fluorescent lamp or a mercury vapor lamp, for example. The pattern is then projected, as with an objective lens 69, to an image plane 71 where the image of the pattern is scanned by a slit in a box 73 in the horizontal direction shown by the arrow 75. The scanned image is converted to an alternating signal, analyzed, and the MTF calculated as described in Example 1.

FIGS. 5, 6, 7 and 8 are graphs of recorded image signals derived from faceplate panels having four different type finishes on the outer or front surface thereof. The graphs are sinusoidal with a spatial frequency of about 4 cycles/mm. Data for these samples is tabulated in Table 1.

TABLE 1

| FIG. | Source | Type Finish | $V_{max}$ | $V_{min}$ | MTF |
|---|---|---|---|---|---|
| 5 | Corning | Wet Etch | .9 | .34 | .45 |
| 6 | RCA | Lithium Silicate Coating | .8 | .2 | .60 |
| 7 | Asahi | Wet Etch | .9 | .13 | .75 |
| 8 | OCLI | Quarter-Wave Coating | .9 | .01 | .98 |

The front or outer surfaces of viewing windows can be characterized in part by specular reflectance SR, as mentioned above. SR values range from the nominal 4% for highly-polished surfaces to about 1% for rougher surfaces for reducing glare. Surfaces with extreme roughness, while producing SR values lower than 1%, fail to meet the minimum criterion for acceptable resolution or viewability of a transmitted image. The resolution or image viewability characteristic may be measured quantitatively as the MTF on the unassembled viewing window or on the viewing window of a finished color display tube by the novel method described below.

Overall characterization of a viewing window may be achieved with a combination of SR and MTF data. Current capability of processes for producing etched and coated finishes has led, for example, to a practical specification of a combination of 2% maximum SR as measured by a commercial gonioreflectometer, and 0.5 minimum MTF at about 1 to 8 cycles per millimeter by the novel method.

A comparison of samples with windows with four different types of front surface finish is shown in Table 2. Samples 1 and 6 are judged at present to have the best compromise of SR and MTF for video data displays. In Table 2, the SR values were measured with essentially monochromatic light in a narrow range around 550 nanometers, and MTF values were measured at a spatial frequency of about 4 cycles/mm.

TABLE 2

| Sample No. | Type Finish | SSR at 550 nm | MTF at 4 mm$^{-1}$ |
|---|---|---|---|
| 1 | Dry Grind and Polish | 1.0 avg. | .76 |
| 2 | " | .95 avg. | .74 |
| 3 | " | .85 avg. | .75 |
| 4 | " | 1.2 | .76 |
| 5 | " | 1.1 | .77 |
| 6 | " | 1.0 | .76 |
| 7 | Quarter-Wave Coating | 0.1 | 1.0 |
| 8 | Wet Etch | 1.6 avg. | .66 |
| 9 | Wet Grind and Polish | 1.58 | .44 |
| 10 | " | 2.39 | .63 |
| 11 | " | 1.76 | .41 |
| 12 | Lithium Silicate Coating | 1.44 | .63 |
| 13 | " | 1.61 | .62 |

TABLE 2-continued

| Sample No. | Type Finish | SSR at 550 nm | MTF at 4 mm$^{-1}$ |
|---|---|---|---|
| 14 | " | 1.48 | .62 |
| 15 | " | 2.71 | .87 |
| 16 | " | 1.11 | .62 |
| 17 | " | .77 | .52 |
| 18 | " | .70 | .48 |
| 19 | " | .52 | .44 |
| 20 | Wet Etch | 1.47 | .42 |
| 21 | " | 1.45 | .37 |
| 22 | " | 1.38 | .41 |
| 23 | " | 1.75 | .61 |
| 24 | " | 1.34 | .40 |
| 25 | " | 1.43 | .40 |
| 26 | " | 1.34 | .35 |
| 27 | " | 1.23 | .39 |
| 28 | Dry Grind and Polish | 1.4 | .80 |

What is claimed is:

1. A method for determining the value of the MTF (modulation transfer function) at a particular spatial frequency of a viewing window, said method consisting essentially of
   A. producing a pattern of light at one surface of said window, said pattern consisting of alternate areas of light and darkness along a particular path, said alternations corresponding substantially to said particular spatial frequency,
   B. projecting at least a portion of said light pattern including said path through said window,
   C. scanning said projected portion of said light pattern along the projection of said path in an image plane in such manner as to produce an image signal that is alternating in character at substantially said spatial frequency,
   D. calculating the average maximum value $V_{max}$ and the average minimum value $V_{min}$ of said image signal and
   E. calculating said value of the MTF according to the formula $$MTF = \frac{V_{max} - V_{min}}{V_{max} + V_{min}}.$$

2. The method defined in claim 1 wherein said spatial frequency of said pattern is in the range of 1 to 8 cycles per millimeter.

3. The method defined in claim 1 wherein said spatial frequency of said pattern is about 4 cycles per millimeter.

4. A method for determining the value of the MTF (modulation transfer function) at a particular spatial frequency of a light-transmitting window, said window having an inner surface and an outer surface, said outer surface having been processed to reduce glare and/or reflection of ambient sources of light from said outer surface, said method consisting essentially of
   A. producing a sharply-defined pattern of light at said inner surface, said pattern consisting essentially of an array of alternate areas of light and darkness when scanned along a particular path, said alternations being at said particular spatial frequency,
   B. optically projecting said light pattern through said window to an image plane spaced from said outer surface,
   C. scanning said image plane and detecting the scanned light with a photodetector along the projection of said particular path, thereby producing an image signal that is alternating in character.
   D. calculating the average maximum value $V_{max}$ and the average minimum value $V_{min}$ of said image signal of the scanned portion of said projected light image and
   E. calculating said value of MTF according to the formula:

$$MTF = \frac{V_{max} - V_{min}}{V_{max} + V_{min}}.$$

5. The method defined in claim 4 wherein said outer surface has been coated with a quarter-wave-type anti-reflection coating.

6. The method defined in claim 4 wherein said outer surface has been coated with a light-scattering, glare-reducing coating.

7. The method defined in claim 4 wherein said outer surface is uncoated and has a light-scattering, glare-reducing finish.

8. The method according to claim 4 including determining the reflectance of said outer surface as a percentage of light reflected by said outer surface in the specular angle from an incident light beam.

9. The method according to claim 8 wherein the value of MTF is greater than 0.5, and the value of reflectance is less than 2.0%.

10. The method according to claim 4 wherein said light pattern consists essentially of white light and the scanned portion of said light image is passed through a photopic filter prior to detection with said photodetector.

11. A method for grading a glass viewing window for viewability, said window having a light-scattering outer surface, said window to be used for transmitting video pictures on a luminescent viewing screen at the inner surface of said window, said screen comprising a repetitive array of picture elements, said method comprising
   A. producing a sharply-defined light pattern of picture elements at the inner surface of said window, which pattern at least approximates the repetitive character of said array of picture elements at a particular spatial frequency, step A. including providing an opaque-and-clear stencil on the inner surface of said window, and illuminating said stencil so that light passes through clear areas of said pattern in the direction of said outer surface,
   B. projecting at least a portion of said light pattern through said window to an image plane,
   C. scanning said image plane along a path which passes through a repetitive portion of said projected pattern with a photodetector in such manner as to produce an alternating image signal of a particular spatial frequency,
   D. calculating the average maximum value $V_{max}$ and average minimum value $V_{min}$ of said image signal and
   E. calculating said viewability as the value of MTF (modulation transfer function) of said window by the formula:

$$MTF = \frac{V_{max} - V_{min}}{V_{max} + V_{min}}$$

12. The method defined in claim 11 wherein said viewing window is for use in a shadow-mask type color television picture tube and said method is conducted prior to assembling said window in said tube.

13. The method defined in claim 12 wherein said pattern is a black matrix for said tube, and only the apertures for one of the emission colors in said matrix are illuminated.

14. The method defined in claim 11 wherein said viewing window is incorporated into a cathode-ray tube having a viewing screen comprising picture elements of three different emission colors, and said method is conducted while said tube is operable.

15. The method defined in claim 14 wherein said tube includes a black matrix on the inner surface of said window, and step A. includes exciting only one of the three emission colors of the viewing screen of said tube.

16. The method defined in claim 15 wherein said black matrix is a black coating on the inner surface of said window, said coating having a hexagonal array of apertures therethrough.

17. The method defined in claim 16 wherein the apertures for each of the emission colors are centered along parallel lines, said lines having a spatial frequency in the range of about 1 to 8 cycles per millimeter, and said scanning path is substantially normal to said parallel lines.

* * * * *